United States Patent
Morgan et al.

[15] 3,646,984
[45] Mar. 7, 1972

[54] APPARATUS FOR REMOVING A TIRE TREAD

[72] Inventors: Harvey E. Morgan; Theodore Suttle, both of Salisbury; Jackson C. Schenck, Rockwell, all of N.C.

[73] Assignee: Brad Ragan, Inc., Spruce Pine, N.C.

[22] Filed: Feb. 4, 1970

[21] Appl. No.: 8,514

[52] U.S. Cl. ............................................................. 157/13
[51] Int. Cl. .......................................................... B29h 21/08
[58] Field of Search ................................. 157/13; 144/288 A

[56] References Cited

UNITED STATES PATENTS

| | | | |
|---|---|---|---|
| 2,257,898 | 10/1941 | Breth | 144/288 A |
| 2,392,667 | 1/1946 | Hawkinson | 157/13 X |
| 2,645,147 | 7/1953 | Hawkinson | 157/13 |
| 3,117,047 | 1/1964 | Capistrant et al. | 157/13 X |
| 3,162,233 | 12/1964 | Stull | 157/13 |

*Primary Examiner*—Granville Y. Custer, Jr.
*Attorney*—Parrott, Bell, Seltzer, Park & Gibson

[57] ABSTRACT

Apparatus for preparing a previously used tire carcass for retreading, such as by removal of tread from the circumferential face thereof, wherein a tire carcass is mounted on a tire stand for rotation about horizontal and vertical axes while a tool head support mounts a tool for movement adjacent the tire stand means and for engagement of the tool with a circumferential face of a tire carcass rotating about the horizontal and vertical axes. Movement of the tool is restrained to translation along a line extending in predetermined relation to the axes of tire carcass rotation, with the compound rotation of the tire carcass cooperating with translational movement of the tool to result in a particularly compact apparatus being provided.

7 Claims, 16 Drawing Figures

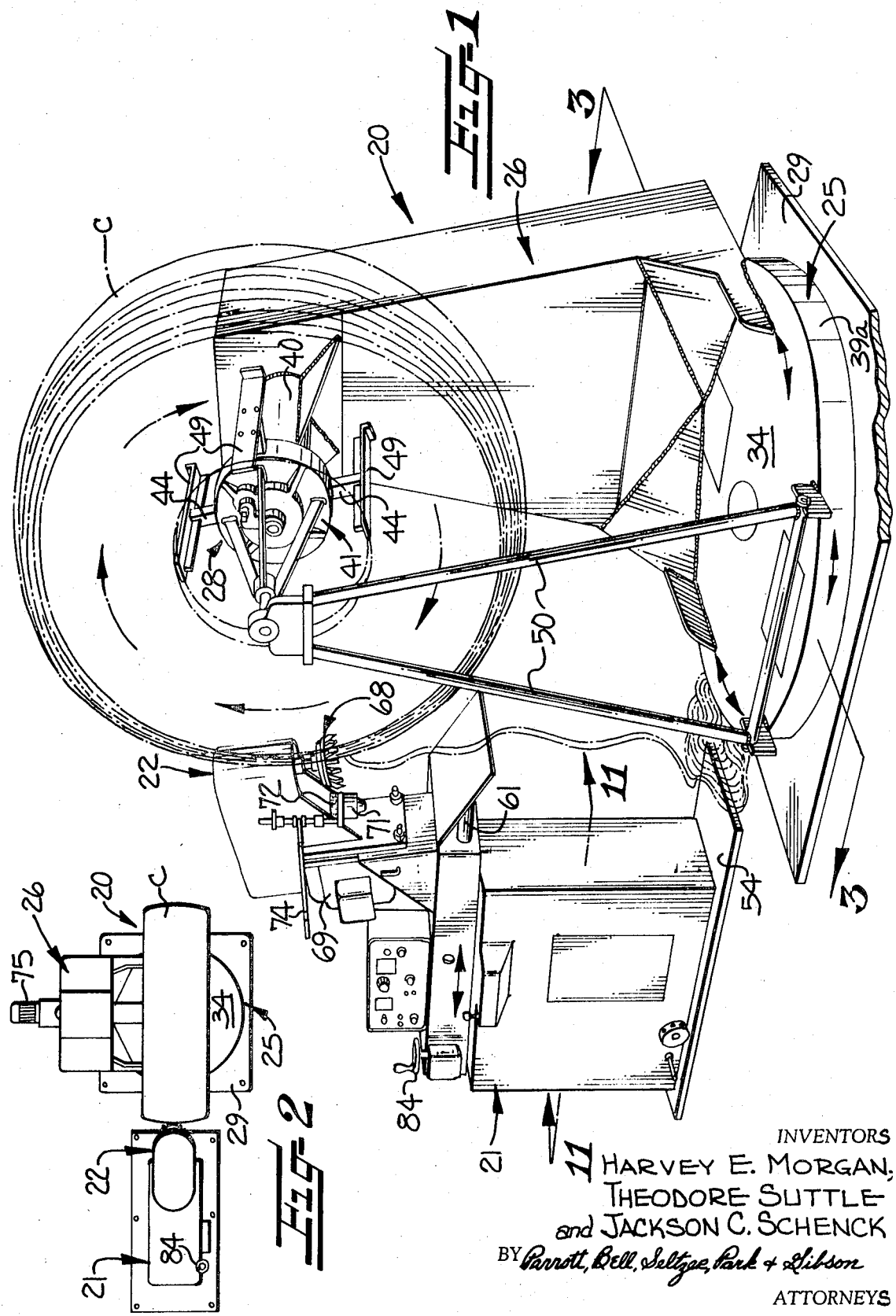

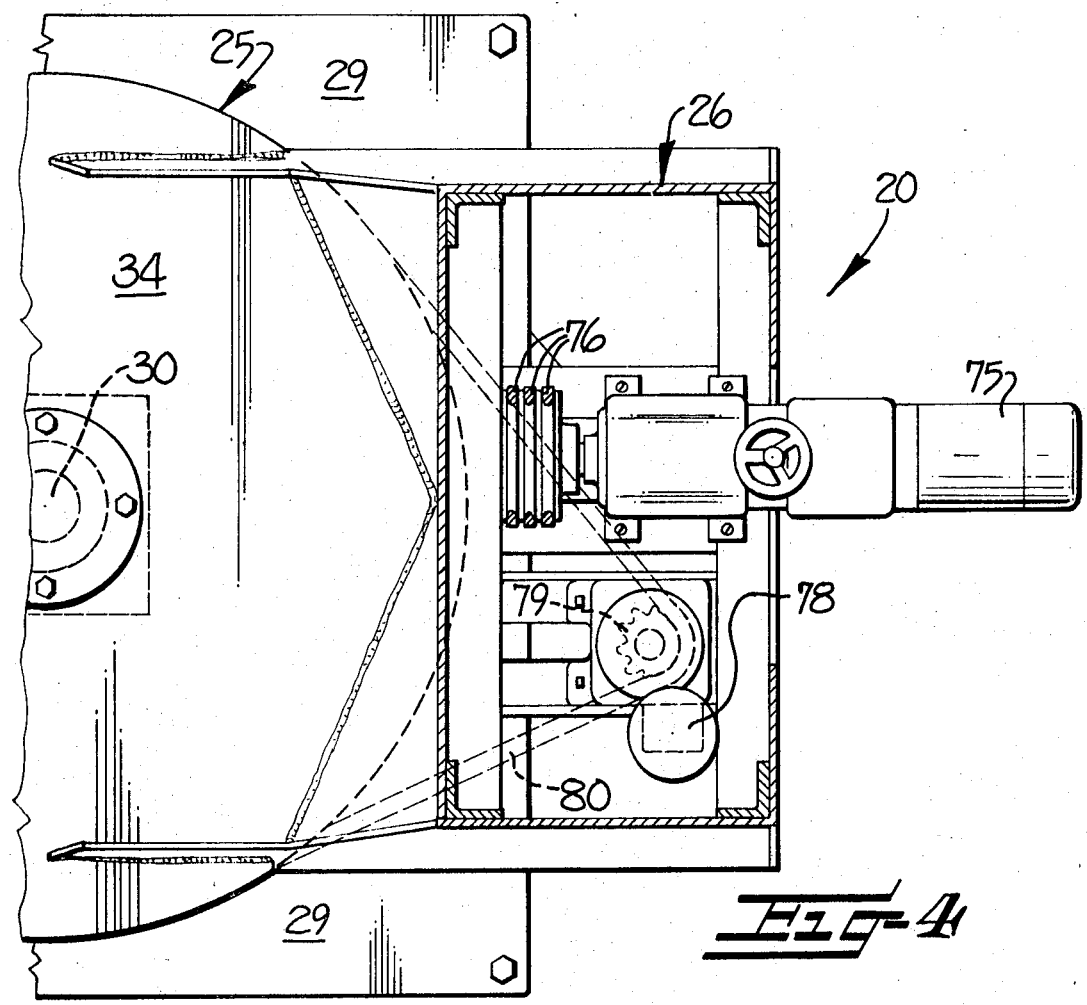
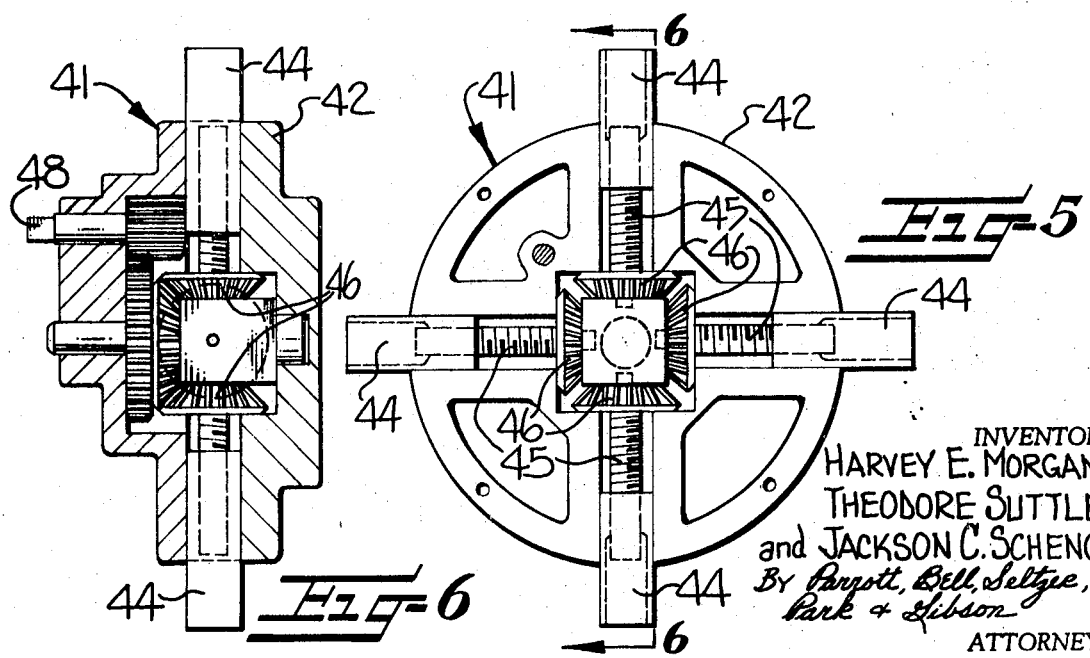

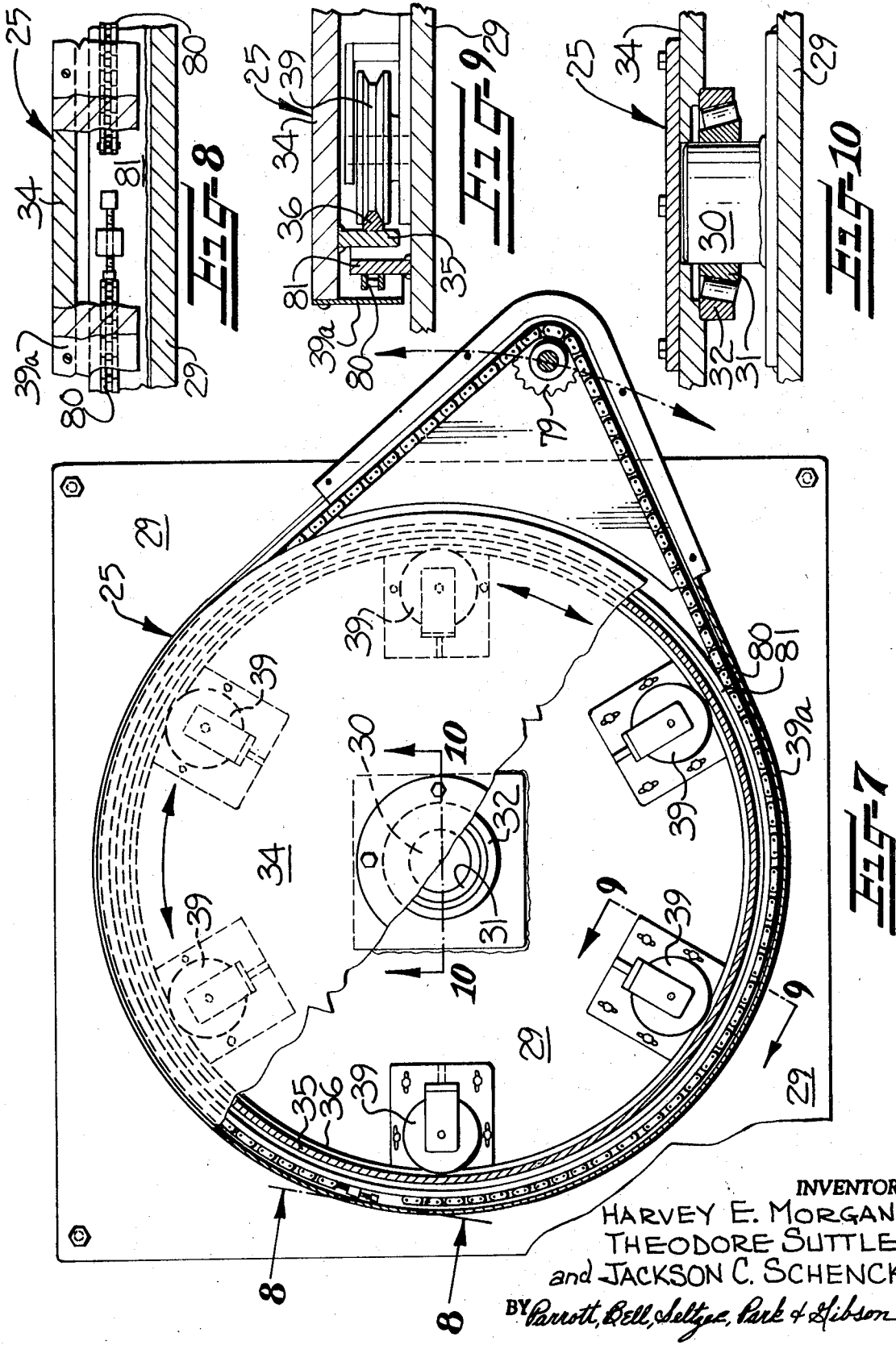

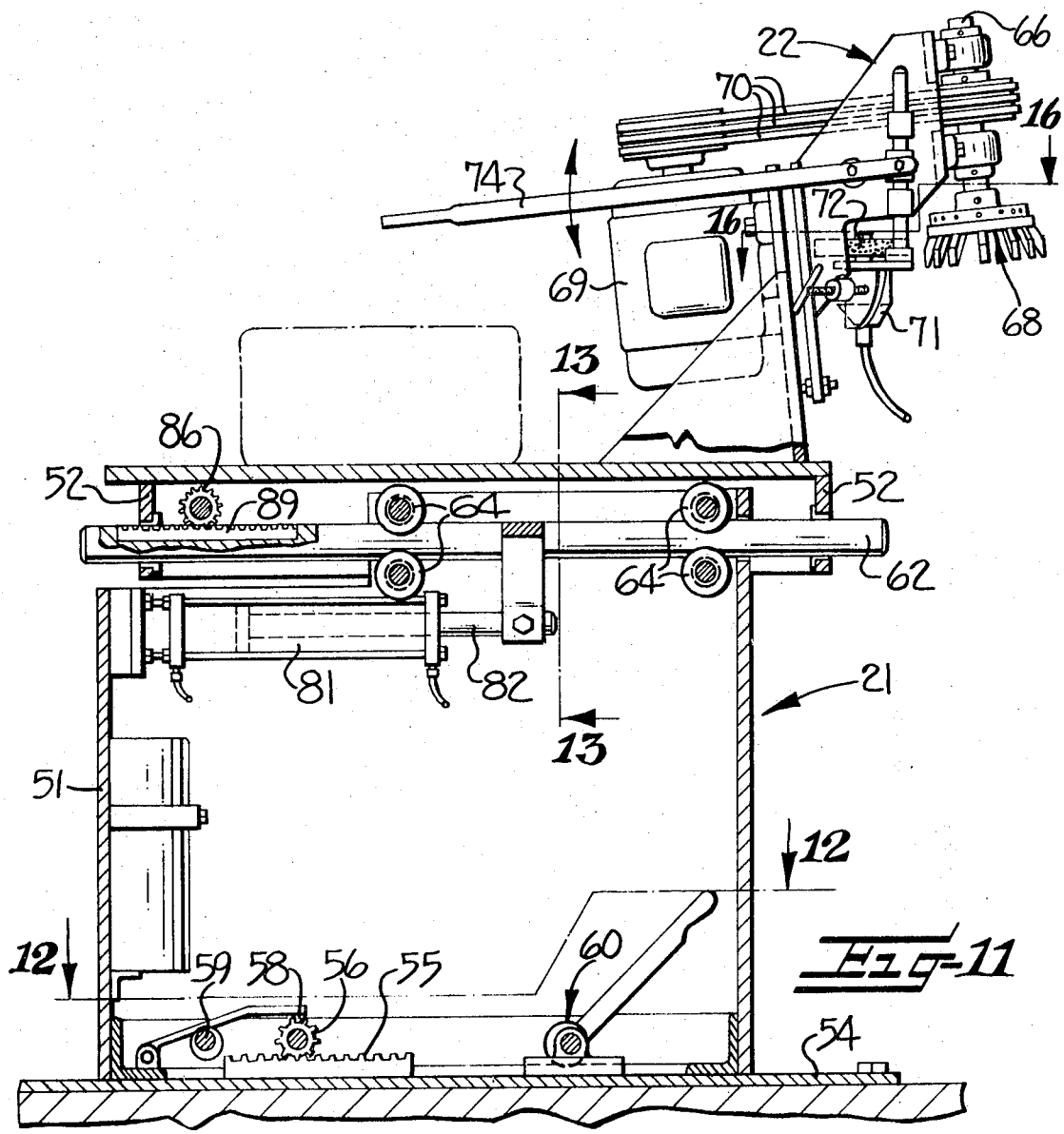
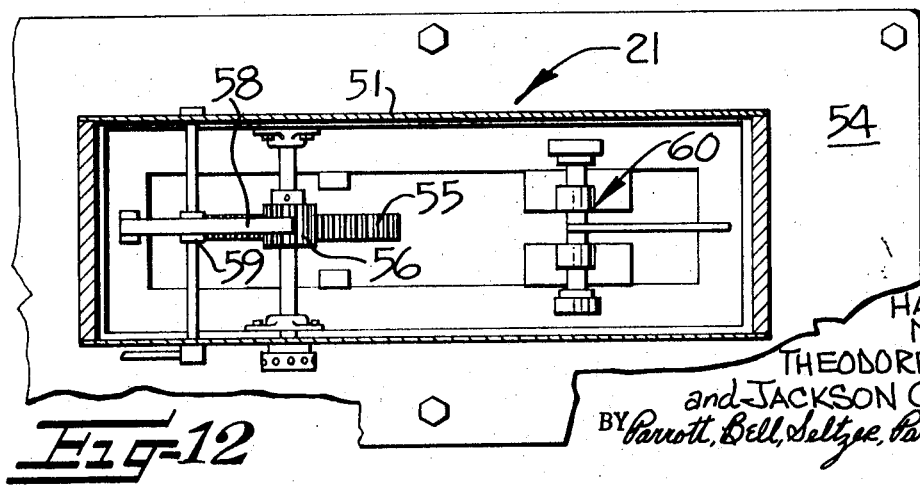

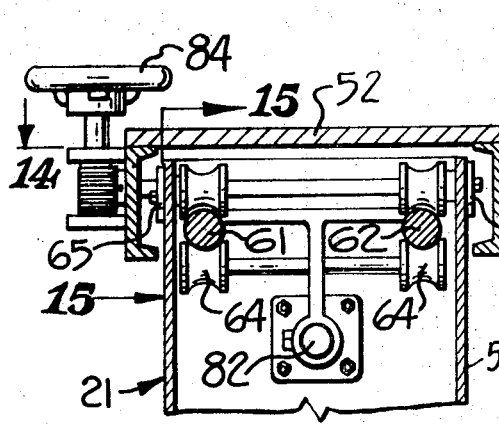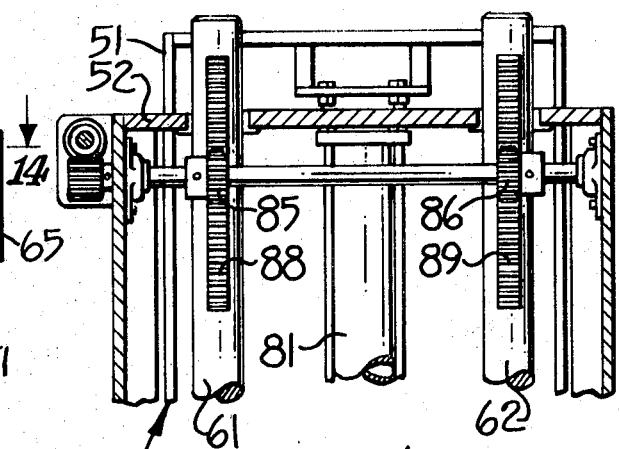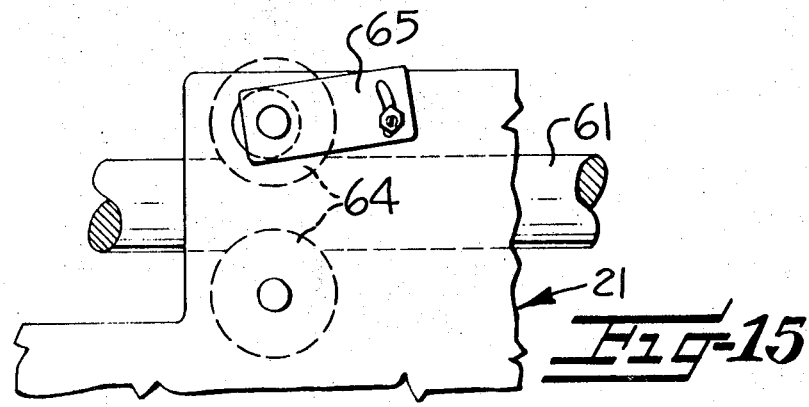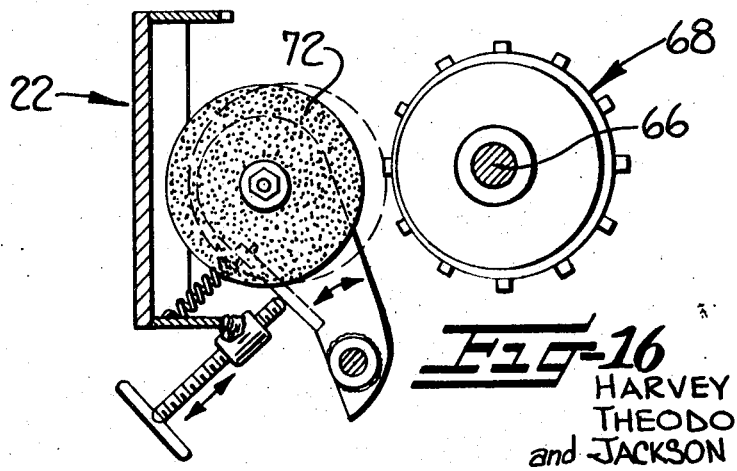

APPARATUS FOR REMOVING A TIRE TREAD

In the reconditioning of previously used tire carcasses, one step conventionally required in any process being followed is the removal of tread material from a circumferential face of the tire carcass. Other similar operations must also be performed on previously used tire carcasses during a reconditioning process, which similarly require engagement of a tool with the circumferential face of a tire.

Particularly in connection with processes for reconditioning of heavy-duty off-the-road tires, such as are used by earthmoving machines, loader-dozers and the like, difficulty is encountered due to the large size of the tires being handled. While equipment has been developed and methods used heretofore for operating on the circumferential faces of tires of this type, several notable deficiencies have been encountered. First, the apparatus is quite large and bulky, occupying substantial floor space in a tire reconditioning shop and presenting difficulty in arranging for proper movement of tire carcasses to and from the apparatus. Secondly, such apparatus as has heretofore been available have apparently been constructed with a view to facilitating prior art tire preparation methods in which material was removed from substantial portions of the sidewalls of a tire carcass and are not sufficiently flexible to permit ready adaptation to more recently developed processes in which the sidewall portions of a carcass are kept substantially in their original condition.

With the above discussion in mind, it is an object of the present invention to reduce the floor space required in a tire reconditioning plant for accommodating an apparatus which performs operations on the circumferential face of a previously used heavy-duty tire carcass. In accomplishing this object of the present invention, means are provided for mounting a tire carcass to be operated upon for rotation about a vertical axis and for rotation about a horizontal axis. In cooperation with such compound movement of the tire carcass, a toolhead means which comprises a tool for engaging and operating on a circumferential face of the tire carcass is supported from a support means which restrains movement of the toolhead means to translation along a line extending in predetermined relation to the axes of tire carcass rotation. The combination of tire carcass rotation about horizontal and vertical axes together with such linear movement of the toolhead means passes the tool in engagement with the circumferential face of the tire carcass while making possible a particularly compact structure.

A further object of the present invention is to accomplish the removal of tread from the circumferential face of a previously used heavy-duty tire carcass of the off-the-road type in accordance with a method which provides substantial flexibility of control for an operator, such that the tire carcass being operated upon may be prepared for reconditioning or retreading in accordance with any desired procedure or process. In realizing this object of the present invention, advantage is taken of the wide flexibility in operation made available by a structure as discussed briefly above, through the driving of a tire carcass in controlled rotation about vertical and horizontal axes and controlled translation of a toolhead relative to the rotating tire carcass.

Some of the objects and advantages of the invention having been stated, others will appear as the description proceeds, when taken in connection with the accompanying drawings, in which FIG. 1 is a perspective view of an apparatus in accordance with the present invention, showing in phantom lines the position of a tire carcass to be operated upon;

FIG. 2 is a plan view of the apparatus of FIG. 1;

FIG. 4 is a plan view, partially in section, through a portion of the apparatus shown in FIG. 3, taken generally along the line 4—4 in FIG. 3;

FIG. 5 is an elevation view, partially in section, through a tire carcass engaging mandrel included in the structure of FIG. 3, taken generally along the line 5—5 in FIG. 3;

FIG. 6 is an elevation view, partially in section, through the tire engaging mandrel of FIG. 5, taken generally along the line 6—6 in FIG. 5;

FIG. 7 is a plan view, partially in section, through a turntable means included in the apparatus of FIG. 3, taken generally along the line 7—7 in FIG. 3;

FIG. 8 is an elevation view, partially in section, through a portion of the turntable means of FIG. 7, taken generally along the line 8—8 in FIG. 7;

FIG. 9 is an elevation view, partially in section, through a portion of the turntable means of FIG. 7, taken generally along the line 9—9 in FIG. 7;

FIG. 10 is an elevation view, in partial section, through a center portion of the turntable means of FIG. 7, taken generally along the line 10—10 in FIG. 7;

FIG. 11 is a side elevation view, in partial section, through a toolhead support means and toolhead means incorporated in the apparatus of FIG. 1;

FIG. 12 is a plan view, in partial section, through a portion of a base of the toolhead support means shown in FIG. 11, taken generally along the line 12—12 in FIG. 11;

FIG. 13 is an elevation view, in partial section, through a slide and intermediate support members of the toolhead support means of FIG. 11, taken generally along the line 13—13 in FIG. 11;

FIG. 14 is a plan view, in partial section, through a portion of the toolhead support means of FIG. 13, taken generally along the line 14—14 in FIG. 13;

FIG. 15 is an enlarged elevation view, partially in phantom, showing a portion of the apparatus shown in FIG. 13 and taken generally along the line 15—15 in FIG. 13; and FIG. 16 is a plan view, in partial section, through a portion of the toolhead means shown in FIG. 11, taken generally along the line 16—16 in FIG. 11.

Figure 3:
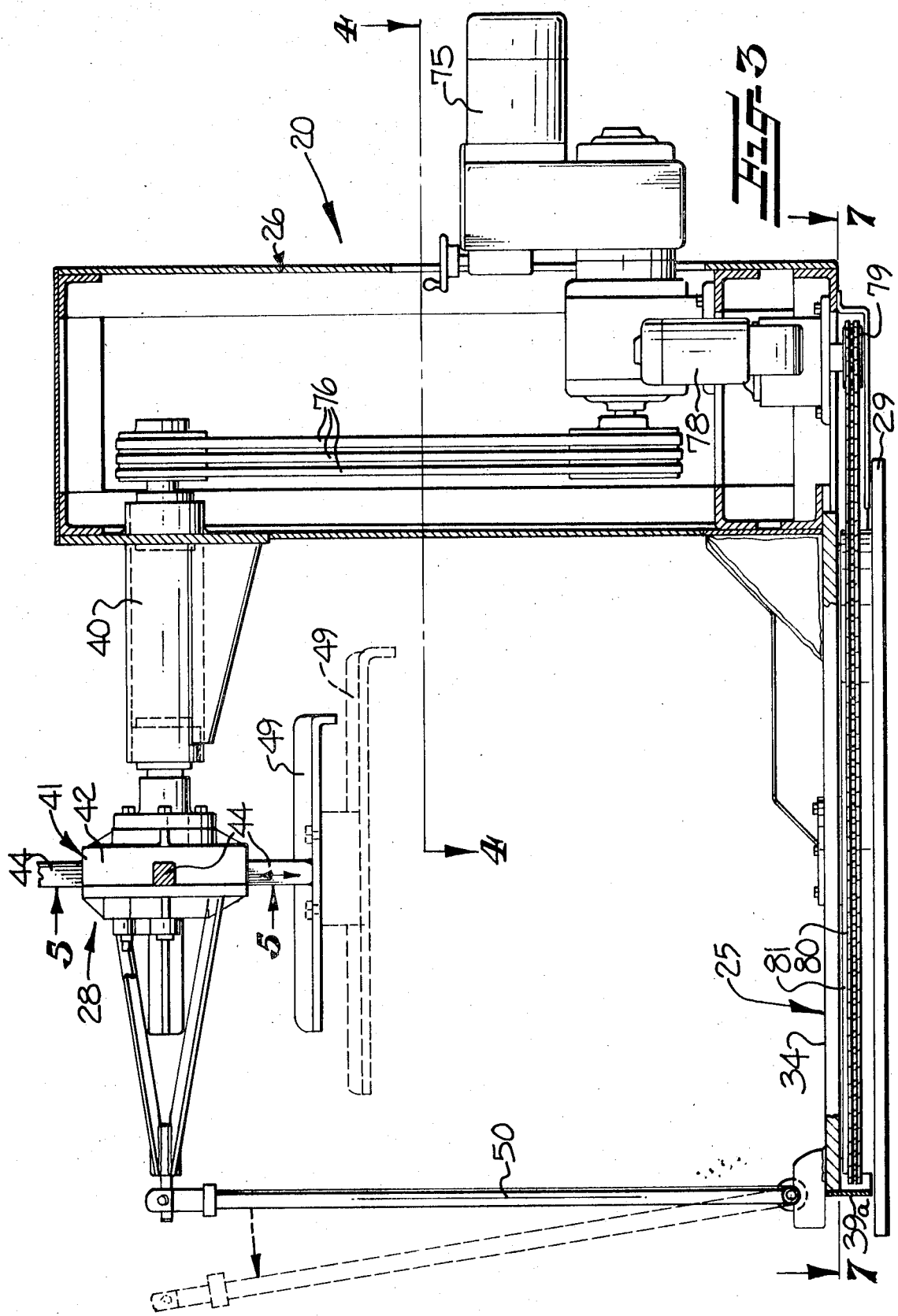
FIG. 3 is an elevation view, partially in section, of a portion of the apparatus shown in FIG. 1, taken generally along the line 3—3 in FIG. 1.

Referring now more particularly to the drawings, the apparatus of the present invention, to be described in detail hereinafter, is generally illustrated in FIGS. 1 and 2 and is there shown to comprise tire stand means generally indicated at 20, toolhead support means generally indicated at 21, and toolhead means generally indicated at 22. Each of these generally designated means incorporated in the apparatus of the present invention is constructed in a particular manner described more fully hereinafter, for cooperation with the other elements of the apparatus in performing an operation on a previously used tire carcass such as indicated in phantom lines in FIG. 1 and identified generally by the reference character C. While the apparatus of the present invention is particularly illustrated with reference to removal of tread from the circumferential face of the tire carcass C, it is to be recognized at the outset that the present invention contemplates that apparatus of the type described hereinafter is useful in all operations which might be performed on a circumferential face of a tire carcass during a process of reconditioning or retreading the tire carcass. The method of the present invention will be made clear by the disclosure hereinafter regarding use of the apparatus illustrated.

The tire stand means generally indicated at 20 mounts the tire carcass C for rotation about a horizontal axis and for rotation about a vertical axis. To this end, the tire stand means 20 particularly comprises a turntable means 25, an upright standard 26 mounted on and movable with the turntable means 25, and tire carcass engaging means 28 mounted on the standard 26 for rotation about a horizontal axis. In accordance with important features of the present invention, the horizontal axis about which the tire carcass engaging means 28 rotates and the vertical axis about which the turntable means 25 rotates intersect and the tire carcass C mounted on the tire carcass engaging means 28 is located relative to the tire stand means 20 in such a manner that the intersection of the horizontal and vertical axes is located substantially centrally of the tire carcass.

More particularly, the tire stand means 20 includes a base plate 29, secured in place at a location of use of the apparatus, such as by bolting to a shop floor. Generally centrally of the base plate 29 is located a center bearing stubshaft 30 (FIG. 10) which receives and engages the inner race 31 of an antifriction thrust bearing such as a roller bearing. The outer race 32 of the antifriction bearing is in engagement with a turntable plate 34 of the turntable means 25. Preferably, the turntable plate 34 has a circular configuration, and a support leg 35 depends from the lower surface thereof just inwardly of the outer circumference (FIG. 9). The support leg 35 carries a radially inwardly projecting rib member 36, which enters into a plurality of circumferentially spaced-apart grooved rollers 39 (FIGS. 7 and 9). The plurality of grooved rollers 39, which are mounted from the tire stand means base plate 29, cooperate with the rib member 36 and support leg 35 in providing an additional support and stabilizing means for the turntable plate 34. By means of the cooperation of the antifriction bearing and the structure just described, the turntable plate 34 is supported for rotation about a vertical axis coaxial with the center of the turntable mounting stubshaft 30.

In order to protect against possible injury during rotation of the turntable means 25 relative to the base plate 29, and in order to protect an actuation means for rotating the turntable as will be discussed more fully hereinafter, a guard member 39a extends around the outer periphery of the turntable plate member 34 and extends downwardly therefrom to terminate just above the turntable means base plate 29.

The upright standard 26 which is included in the tire stand means 20 preferably is constructed from steel plate and angle member of appropriate sizes to bear the loads imposed on the tire stand means and is welded to the turntable means plate member 34 for movement therewith about the vertical axis defined by the mounting stubshaft 30. The principal function of the upright standard 26 is to serve as a mounting for the tire engaging means 28, in order that that means may be carried by the turntable means for movement therewith and for rotation about a horizontal axis spaced above the turntable means and intersecting with the vertical axis. In the form illustrated, the horizontal axis is defined by a driven shaft extending through a shaft housing 40. To one end of the driven shaft is secured an expandable mandrel 41 for entering into a central opening of a toroidal tire carcass to be prepared for removal and for positioning an engaged tire carcass with the center thereof substantially coincident with the intersection of the vertical and horizontal axes.

To this end, the expandable mandrel 41 comprises a mandrel housing 42 (FIGS. 3, 5 and 6) having mounted therein a plurality of radially extending bar members 44. Each of the bar members 44, at its innermost end, is provided with a female screw thread to receive a male threaded member 45 driven in rotation by a bevel gear 46. By means of an operative connection of the bevel gears 46 which are thusly coupled to each of the radial bar members 44, rotation of a driving stud 48 causes radial inward and outward movement of the bars 44 (as indicated by arrows in FIG. 3). Secured to the outer radial extremity of each of the bar members 44 is a transverse tire engaging member 49 for engaging the bead portion of a tire carcass to be operated upon, such as the carcass C of FIG. 1. As indicated by phantom lines in FIG. 3, adaptation of the apparatus of the present invention to tires of larger sizes may be facilitated by securing to the members 49 additional spacer blocks and bead engaging members to cooperate in engaging tire carcasses of larger sizes.

In order to ensure proper support of a tire carcass of relatively great weight, provision is made for an outboard support of the driven shaft enclosed within the shaft housing 40. As more particularly shown in FIGS. 1 and 3, an outboard supporting A-frame member 50 is adapted to cooperate with an outboard extension from the mandrel housing 42, so that a carcass C being operated upon is supported from either side of the center thereof rather than being supported in a cantilever configuration. In order to facilitate placement of a tire carcass C on the tire stand 20, the outboard A-frame member 50 is constructed and arranged for temporary removal at the time that tires are being loaded onto and unloaded from the tire stand means 20 (as indicated in phantom lines in FIG. 3).

The present subject invention provides toolhead support means 21 and toolhead means 22 for cooperating with the tire stand means 20 in operating upon a previously used tire carcass, as briefly outlined above. In accordance with the present invention, the toolhead support means 21 mounts the toolhead means 22 for movement adjacent the tire stand means 20 and comprises means for restricting movement of the toolhead means 22 to translation along a line extending in predetermined relation to the axes of tire carcass rotation. In particular, the movement of the toolhead means 22 is restricted to translation along a line generally in a common plane with the vertical axis about which the tire carcass C rotates. As will be brought out more fully hereinafter, such restriction of movement is accomplished through provision of means coupling together a base 51 which is secured in predetermined spaced relation to the tire stand means 20 and a slide 52 carrying the toolhead means 22.

In accordance with the present invention, the base 51 comprises a base plate member 54 secured in place in a manner similar to the base plate 29 of the tire stand means 20, as by bolting to a shop floor. Rising upwardly from the base plate 54 is a generally boxlike structure fabricated of sheet steel or the like and normally fixed in position relative to the base plate 54. However, in order to provide for accommodation of a wide variety of sizes of tire carcasses without necessitating repositioning of the base plate 54, the boxlike structure preferably is provided with means for permitting adjusting movement thereof relative to the base plate. As shown in FIGS. 11 and 12, such a means for permitting adjusting movement incorporates a rack member 55 secured to the base plate 54 and a pinion member 56 meshing with the rack 55. A dog latch member 58 normally engages the pinion 56 to preclude rotation thereof and thus lock the structure of the base 51 in position, but provision is made for a camming shaft 59 to lift the latch 58 from engagement with the pinion 56. Upon the latch 58 being raised from engagement with the pinion 56, the pinion 56 may be rotated to displace the boxlike structure of the base 51 relative to the base plate 54. A wedging brake 60, enclosed within the boxlike structure and acting against the base plate 54, provides additional resistance to forces acting to push the base 51 away from the tire stand means 21, which such forces arise during operation of the apparatus of the present invention. Normally, the brake 60 is wedged into tight engagement with the base plate 54 to ensure that the base 51 is locked against movement relative to the tire stand means 20.

In order to accomplish movement of the slide 52 relative to the base 51, while restricting such movement to translation along a line, means are provided coupling the slide 52 to the base 51. More particularly, the means coupling the slide and base preferably comprises a pair of guiding intermediate members 61, 62 mounted in the toolhead support base 51 for translational movement relative thereto along parallel lines in a plane generally parallel to the horizontal axis of rotation of the tire engaging means 28. In the form illustrated, the guiding intermediate members 61, 62 are rod members, which are positioned between and cooperate with a plurality of mounting rollers 64 to provide relative motion as described more fully hereinafter. In order to ensure that alignment of the intermediate members 61, 62 is maintained, certain of the roller members 64 are mounted in an eccentric lever arrangement as shown in FIG. 15. There, movement of a mounting lever arm 65 permits displacement of the center of rotation of one of the rollers 64 mounted from the base 51, in such a manner as to ensure proper engagement of the intermediate member 61 between opposing upper and lower rollers 64.

By means of the rollers 64, and in order to cooperate with the actuation means described more fully hereinafter, the intermediate members 61 and 62 are movable relative to the base 51 and the slide 52 is movable relative to the intermediate members 61, 62. While this relative movement retains the restriction of movement of the slide 52 to linear translation, it provides for particularly favorable adjustment of the position of the slide 52 relative to the carcass C of the tire undergoing operations in accordance with the method of the present invention.

The toolhead means 22 mounted on the slide 52 for movement therewith relative to the tire stand means 20 comprises, in the form particularly illustrated, a cutting tool arrangement having broad similarity to certain cutting tool arrangements disclosed in previously granted patents. More particularly, the toolhead means comprises a spindle 66 supported for rotation about a generally vertical axis and a multibladed cutting tool 68 secured to a lower extremity of the spindle 66. An appropriate drive means such as an electric motor 69 is provided and is operatively connected to the spindle 66 as by means of a plurality of belts 70, to drive the spindle 66 and tool 68 in rotation. It is specifically noted that, while the axis of rotation of the spindle 66 and tool 68 is generally vertical, the axis is in fact canted slightly from the vertical, with the upper extremity of the spindle 66 being inclined rearwardly toward the base 51. This orientation of the spindle 66 and tool 68 is preferred for best cooperation of the elements of the apparatus as herein illustrated, where the relative heights of the entire carcass engaging means 28 and the toolhead means 22 places the toolhead means below the horizontal axis about which the tire carcass engaging means 28 revolves. In other orientations, the generally vertical position of the spindle 66 might be inclined in other manners from a true vertical position and the description of the spindle position as being "generally vertical" is not intended to preclude such minor variation and inclination thereof as may be found preferably to accommodate a particular operating condition or apparatus structure.

As an auxiliary feature of the apparatus of the present invention, an air motor 71 preferably is mounted adjacent the tool 68 and drives an abrasive wheel 72 in rotation upon application of air pressure to the motor 71. By means of an operating lever 74, the abrasive wheel 72 is brought into contact with the outer periphery of the blades of the tool 68, to sharpen the same from time to time as required in operating upon the circumferential face of a tire carcass.

In providing for operation of the various elements of the apparatus described above, and in achieving the particularly favorable results made possible by the method of the present invention, actuation means are provided for rotating the turntable means 25 about the vertical axis, for rotating the tire carcass engaging means 28 about the horizontal axis and for translating the slide 52 of the toolhead support means relative to the tire stand means 20. These various movements occur under the control of an operator through the provision of a control means operable for coordinating the rotation of a tire carcass and the translation of the slide so that the tool 68 is passed into engagement with those portions of the circumferential face of a tire carcass from which tread is to be removed. More particularly, in providing for the mounting for a carcass on the tire stand means 20, the toolhead means 22 is retracted from the operating position, to provide clearance for access to the tire stand means 20 by a forklift truck or other material handling means capable of readily transporting a tire carcass of the heavy-duty off-the-road type with which this invention is particularly concerned. The approach of such material handling apparatus to the apparatus of the present invention may be from any convenient side consistent with plant layout, in view of the capability of the turntable 25 of rotating the standard 26 and tire carcass engaging means 28 to any desired orientation. Upon a carcass C being placed on the tire carcass engaging means 28 and the outboard supporting A-frame 50 being arranged as illustrated for example in FIG. 1, the turntable means 25 is then rotated to position one side edge of the circumferential face of the carcass C generally adjacent the line along which the toolhead means 22 is translated. The tire carcass C is then driven in rotation about the horizontal axis, the tool 68 is driven in rotation about its generally vertical axis, and the slide 52 is translated to bring the tool 68 into engagement with the circumferential face of the tire carcass C. With continuation of these movements, rotation of the turntable means 25 is also begun, to gradually traverse the paths of relative movement between the tool 68 and the circumferential face of the tire carcass C and to bring the tool 68 into engagement with those positions of the circumferential face from which tread is to be removed.

In driving the tire stand means 20 in rotation in the manner just described, first and second drive means are preferably provided for driving the turntable means 25 and the tire carcass engaging means 28 independently. As more particularly illustrated in FIGS. 3 and 4, a first electrical drive motor 75, operating through a variable speed transmission, transmits power to a plurality of endless flexible belts 76 to the driven shaft passing through the shaft housing 40. By means of such a path of power transmittal, the tire carcass engaging means 28 is driven in rotation about the horizontal axis. By adjustment of the variable speed transmission interposed between the first electrical drive motor 75 and the belts 76, the speed of rotation of the tire carcass C may be accommodated as required by variations in the size of carcass being operated upon. Preferably, the rotational speeds available will range from about 2 to about 25 r.p.m., and it may be anticipated that most operations will be conducted with the tire carcass rotating at approximately the middle of that range.

A second electrical drive motor 78 is arranged to drive in rotation a sprocket 79 (FIG. 7) which engages with a loop of chain 80. Inasmuch as opposite ends of the chain 80 are secured to an upstanding curb 81 arising from the base plate 29 (FIGS. 8 and 9), rotation of the sprocket 79 relative to the chain 80 drives the turntable 25 in rotation about the vertical axis (as indicated by arrows in FIG. 7). Preferably, control over the rotational speed of the second electrical drive motor 78 is exercised by an infinitely variable electronic drive control (not illustrated in detail) housed in an operator's control station mounted on the slide 52 (and indicated by phantom lines in FIG. 11). Electronic electrical drive motor controls of this type are well known to persons skilled in the design of power trains, and it is for this reason that the details of such a structure are not included in this disclosure. With such control, the rotational speed of the turntable may range from about 0.05 to about 0.12 r.p.m., with typical operation being at approximately the midpoint of such range.

It is to be noted that the rotational speeds of a carcass about the horizontal and vertical axes, while resulting from independent drives and independently variable within the mentioned ranges, are correlated in a particular manner. A comparison may be drawn to the correlation of spindle speed and tool feed on lathe, where a metal workpiece is turned to shape. Preferably, in practicing the method of the present invention, the rotational speed of a tire carcass about the vertical axis will be no more than about 10 percent of the rotational speed thereof about the horizontal axis and will be in a range of from about 0.2 to about 5.0 percent of such horizontal axis rotational speed.

The actuation means of the apparatus of the present invention further includes means for translating the slide 52 relative to the base 51 of the toolhead support means 21, in order to control the position of the tool 68 of the toolhead means 22 relative to the circumferential face of the tire carcass C undergoing operations thereon. Preferably, and as herein disclosed, the actuation means for translating the slide 52 relative to the base 51 is incorporated in the means coupling the slide and base and comprises both manually operable means and power actuated means operable independently of the manually operable means. As illustrated in FIGS. 11, 13 and 14, a fluid pressure cylinder 81 is arranged to act between the base 51 and the guiding intermediate members 61, 62. By a supply of actuating pressure fluid from a suitable source, such as a shop compressed air line, movement of the piston rod 82 of the actuating cylinder device 81 may be affected positively, at a desired relatively high speed, and to a particular position which is maintained during operation of the apparatus. Thus, movement of the slide 52 at a relatively high speed is made possible, for effecting saving of time in cycling from operating on a first tire carcass to operating on a second tire carcass.

The provision of manually operable means for effecting displacement of the slide 52 relative to the base 51 is contemplated as providing an operator of the apparatus with the capability for accurately controlling the precise location of the tool 68 relative to the circumferential surface of a tire carcass C, and thereby accurately controlling the depth of cut made. Preferably, and as illustrated particularly in FIGS. 11, 13 and 14, the manually operable means comprises a handwheel 84 positioned for ready manipulation by an operator standing beside the base 51 of the toolhead support means 21 and acting through a gear train to rotate pinions 85 and 86 engaging rack gears 88 and 89 secured to the guiding intermediate members 61, 62. Upon rotation of the pinions 85, 86, the slide 52 is moved relative to the intermediate members 61, 62 at a relatively low speed and with very gradual movement. Thus, the manually operable means for effecting displacement of the slide 52 provides a vernier control over the depth of cut made in traversing the tool 68 across the circumferential face of a tire carcass C.

While discussed above with particular reference to the removal of tread material from the circumferential face of a tire carcass mounted on the tire stand means 20 for rotation about horizontal and vertical axes, it is to be noted that the present invention contemplates that the tool comprised in the toolhead means may engage the circumferential face of the tire carcass for performing other operations thereupon. To this end, it is anticipated that various substitutions may be made for the tool 68 illustrated in the figures discussed particularly above.

In the drawings and specification, there has been set forth a preferred embodiment of the invention, and although specific terms are employed, they are used in a generic and descriptive sense only and not for purposes of limitation.

What is claimed is:

1. Apparatus for preparing a previously used tire carcass for reconditioning, such as by removal of tread from a circumferential face thereof, comprising:
    toolhead means for engaging and operating upon a circumferential face of a tire carcass,
    tire stand means for mounting a tire carcass for rotation about respective horizontal and vertical axes and including means for rotating the tire carcass about said axes,
    toolhead support means for mounting said toolhead means adjacent said tire stand means for translational movement along a predetermined line, and
    toolhead positioning means for moving said toolhead means into operative position relative to a tire carcass mounted on said tire stand means and comprising manually operable means for effecting displacement of said toolhead means toward and away from the tire carcass and power actuated means operable independently of said manually operable means for effecting displacement of said toolhead means toward and away from the tire carcass so that control over the position of said toolhead means relative to the circumferential face of a tire carcass being operated upon is selectively effected manually or by power actuation.
    whereby coordinated rotation of a tire carcass about said axes of rotation and translation of said toolhead means along said line passes said toolhead means in engagement with the circumferential face of the tire carcass.

2. Apparatus according to claim 1 wherein said tire stand means comprises turntable means for rotation about said vertical axis, an upright standard mounted on and movable with said turntable means, and tire carcass engaging means mounted on said standard for rotation about said horizontal axis, and further wherein said turntable means and tire carcass engaging means are mounted and arranged with said horizontal and vertical axes intersecting at a location substantially centrally of a tire carcass to be operated upon.

3. Apparatus according to claim 2 wherein said means for driving a tire carcass in rotation comprises a first drive motor operatively connected for driving said turntable means in rotation about said vertical axis and a second drive motor operatively connected for driving said tire carcass engaging means in rotation about said horizontal axis independently of rotation of said turntable means.

4. Apparatus according to claim 1 wherein said toolhead support means comprises a base secured in predetermined spaced relation to said tire stand means, a slide carrying said toolhead means, and means coupling said slide to said base for movement relative thereto along a line lying generally in a common plane with said vertical axis and thereby for restricting movement of said toolhead means to translation along a line.

5. Apparatus according to claim 4 wherein said means coupling said slide and base comprises an intermediate member supported by said base for linear movement relative thereto and supporting said slide for linear movement thereof relative to said intermediate member and wherein said power actuated means effects movement of said intermediate member and said slide relative to said base and thereby relatively rapidly moves said toolhead means relative to said tire stand means and said manually operable means effects movement of said slide member relative to said intermediate member and thereby relatively slowly moves said toolhead means relative to said tire stand means.

6. Apparatus for preparing a previously used tire carcass for renewal by removal of tread from a circumferential face thereof comprising:
    turntable means for rotation about a vertical axis,
    tire carcass engaging means carried by said turntable means for movement therewith and for rotation about a horizontal axis spaced above said turntable means and intersecting with said vertical axis and for receiving a tire carcass to be prepared for renewal,
    a toolhead support base secured in spaced relation to said turntable,
    a pair of guiding intermediate members mounted in said toolhead support base for translational movement along parallel lines in a plane generally parallel to said horizontal axis of rotation of said tire carcass engaging means.
    a toolhead support slide carried by said guiding intermediate members for movement relative thereto and restrained to translation along a line extending in predetermined relation to said horizontal and vertical axes,
    toolhead means mounted on said slide for movement therewith and comprising a spindle supported for rotation about a generally vertical axis, a tool mounted on said spindle for rotation therewith and for engaging a circumferential face of a tire carcass mounted on said tire carcass engaging means for removing tread material therefrom and drive means for driving said spindle and tool in rotation, and
    actuation means for rotating said turntable about said vertical axis, for rotating said tire carcass engaging means about said horizontal axis and for translating said slide and comprising control means operable for coordinating rotation of a tire carcass about said horizontal and vertical axes and translation of said slide so that said tool is passed into engagement with those portions of a tire carcass circumferential face from which tread is to be removed, said actuation means further comprising a fluid pressure cylinder acting between said intermediate members and one of said base and said slide for translating said slide relative to said base and manually operable gearing means acting between said intermediate members and the other of said base and said slide for translating said slide relative to said base.

7. Apparatus according to claim 6 wherein said tire carcass engaging means comprises an expandable mandrel for entering into a central opening of a toroidal tire carcass to be prepared for renewal and for positioning an engaged tire carcass with the center thereof substantially coincident with said intersection of said vertical and horizontal axes.